(12) United States Patent
Dieffenderfer et al.

(10) Patent No.: US 7,406,613 B2
(45) Date of Patent: Jul. 29, 2008

(54) TRANSLATION LOOKASIDE BUFFER (TLB) SUPPRESSION FOR INTRA-PAGE PROGRAM COUNTER RELATIVE OR ABSOLUTE ADDRESS BRANCH INSTRUCTIONS

(75) Inventors: James Norris Dieffenderfer, Apex, NC (US); Thomas Andrew Sartorius, Raleigh, NC (US); Rodney Wayne Smith, Raleigh, NC (US); Brian Michael Stempel, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 11/003,772

(22) Filed: Dec. 2, 2004

(65) Prior Publication Data
US 2006/0149981 A1   Jul. 6, 2006

(51) Int. Cl.
*G06F 1/26* (2006.01)
(52) U.S. Cl. .................. 713/320; 713/323; 712/234
(58) Field of Classification Search .......... 713/320, 713/323, 324; 712/205, 208, 233, 234, 236, 712/237, 238, 239
See application file for complete search history.

(56) References Cited

U.S. PATENT DOCUMENTS

| | | | |
|---|---|---|---|
| 3,800,291 A | 3/1974 | Cocke et al. | |
| 6,591,343 B1 | 7/2003 | Col et al. | |
| 6,678,815 B1 * | 1/2004 | Mathews et al. | 711/205 |
| 6,735,689 B1 | 5/2004 | Thomson et al. | |

FOREIGN PATENT DOCUMENTS

EP   1304620 A   4/2003

OTHER PUBLICATIONS

Kadayif et al, "Generating physical addresses directly for saving instruction TLB energy", Proceedings of the 35th annual ACM/IEEE international symposium on Microarchitecture, pp. 185-196, 2002.*
Min et al, "A Selectively Accessing TLB for High Performance and Lower Power Consumption", IEEE, pp. 45-48, 2002.*
Lee et al, "Energy Efficient D-TLB and Date Cache using Semantic-Aware Multilateral Partitioning", ISLPED 03, Aug. 25-27, 2003, Seoul, Korea.*

* cited by examiner

*Primary Examiner*—Chun Cao
(74) *Attorney, Agent, or Firm*—Nicholas J. Pauley; John L. Ciccozzi; Thomas Rouse

(57) ABSTRACT

In a pipelined processor, a pre-decoder in advance of an instruction cache calculates the branch target address (BTA) of PC-relative and absolute address branch instructions. The pre-decoder compares the BTA with the branch instruction address (BIA) to determine whether the target and instruction are in the same memory page. A branch target same page (BTSP) bit indicating this is written to the cache and associated with the instruction. When the branch is executed and evaluated as taken, a TLB access to check permission attributes for the BTA is suppressed if the BTA is in the same page as the BIA, as indicated by the BTSP bit. This reduces power consumption as the TLB access is suppressed and the BTA/BIA comparison is only performed once, when the branch instruction is first fetched. Additionally, the pre-decoder removes the BTA/BIA comparison from the BTA generation and selection critical path.

22 Claims, 2 Drawing Sheets

TRANSLATION LOOKASIDE BUFFER (TLB) SUPPRESSION FOR INTRA-PAGE PROGRAM COUNTER RELATIVE OR ABSOLUTE ADDRESS BRANCH INSTRUCTIONS

BACKGROUND

The present invention relates generally to the field of processors and in particular to a method of reducing power consumption in a processor by suppressing TLB accesses for intra-page branches where the branch target address can be determined from the branch instruction address or the branch instruction itself.

Portable electronic devices have become ubiquitous accoutrements to modern life. Two relentless trends in portable electronic devices are increased functionality and decreased size. Increased functionality demands increased computing power—in particular, ever faster and more powerful processors.

As well as providing advanced features and functionality that require faster processors, portable electronic devices themselves continue to shrink in size and weight. A major impact of this trend is the decreasing size of batteries used to power the processor and other electronics in the device. While advances in battery technology partially offset the problem, the decreasing size of batteries imposes a requirement to decrease the power budget in portable electronic device electronics, and in particular to decrease the power used by the processor.

Accordingly, processor improvements that increase performance and/or decrease power consumption are desirable for many applications such as portable electronic devices. Modern processors commonly employ a memory hierarchy that places small amounts of fast, expensive memory close to the processor, backed up by large amounts of slower, inexpensive memory somewhat more distant from the processor. A large main memory is commonly divided into logical units called pages. All data or instructions within a page commonly have the same attributes, which define common characteristics, limit access via permissions, and the like. The page attributes are typically stored in a Translation Lookaside Buffer (TLB). In general, for every instruction fetch, the processor should pass the instruction address through the TLB to verify that the program has permission to access and execute the instruction.

Checking attributes such as permissions in the TLB consumes power. Since each instruction on a page has the same attributes and hence the same permissions, once any instruction on the page is verified through the TLB, all other instructions on the same page may be fetched without checking TLB attributes. For example, it is known in the art to bypass a TLB attribute check for instructions executed sequentially to a previously checked instruction, until the sequential instructions cross a page boundary.

It would similarly be advantageous to bypass the TLB attribute check for branch targets that do not leave a page. The branch target address calculation and the selection of the branch target address from which to fetch the next instruction is typically the critical path of a branch instruction, and a limiting factor in determining the machine cycle time. A TLB attribute check of the branch target address may be avoided if the target address is in the same page as the instruction address. However, comparing the branch target address to the address that was last checked by the TLB to determine if the branch target address is with the same page as the last address check by the TLB may lengthen the cycle time by adding delay to a critical path. Additionally, since the calculation must be performed each time the branch instruction executes, the extra power consumed for the calculation would offset the power consumption gained from bypassing the TLB attribute checks for target and instruction addresses determined to be on the same page.

SUMMARY

For branches where the branch target address can be determined from the branch instruction address and/or the branch instruction itself, a pre-decoder may calculate the branch target address, and compare it to the branch instruction address, to determine whether the two addresses are in the same memory page. A branch target same page bit reflecting that condition may be stored in the instruction cache and associated with the branch instruction. When the instruction executes, if the branch is taken, a TLB access to check permissions for the branch target address may be suppressed, in response to the branch target same page bit.

The present invention relates to a method of reducing power consumption in a pipelined processor. The target address of a PC-relative or absolute address branch instruction being in the same memory page as the branch instruction address is detected, prior to decoding the branch instruction in the pipeline. A TLB access is then suppressed when fetching an instruction from the target address, in response to the detection.

The present invention also relates to a method of reducing power consumption in a processor. The target address of a PC-relative or absolute address branch instruction being in the same memory page as the branch instruction address is detected once. An indicator of the detection is stored. A TLB access is suppressed when fetching the target address during a first execution of the branch instruction, in response to the indicator. In addition, A TLB access is suppressed when fetching the target address during a second execution of the branch instruction, in response to the indicator.

The present invention additionally relates to a processor. The processor includes page residence detection logic generating an indication that the target address of a PC-relative or absolute address branch instruction is in the same memory page as the branch instruction address. The processor also includes memory storing the indication, and a TLB generating memory access permission information upon instruction fetches, where the TLB is suppressed in response to the indication when fetching an instruction at the target address while executing the branch instruction.

The present invention further relates to a processor. The processor includes a memory interface accessing memory external to the processor, the memory organized as logical pages. The processor also includes a cache memory in data transfer relationship with the memory interface, the cache memory storing instructions. The processor further includes a pre-decoder interposed between the memory interface and the cache memory, the pre-decoder calculating the branch target address of a PC-relative or absolute address branch instruction prior to storing the instruction in the cache memory.

DETAILED DESCRIPTION

Figure 1:
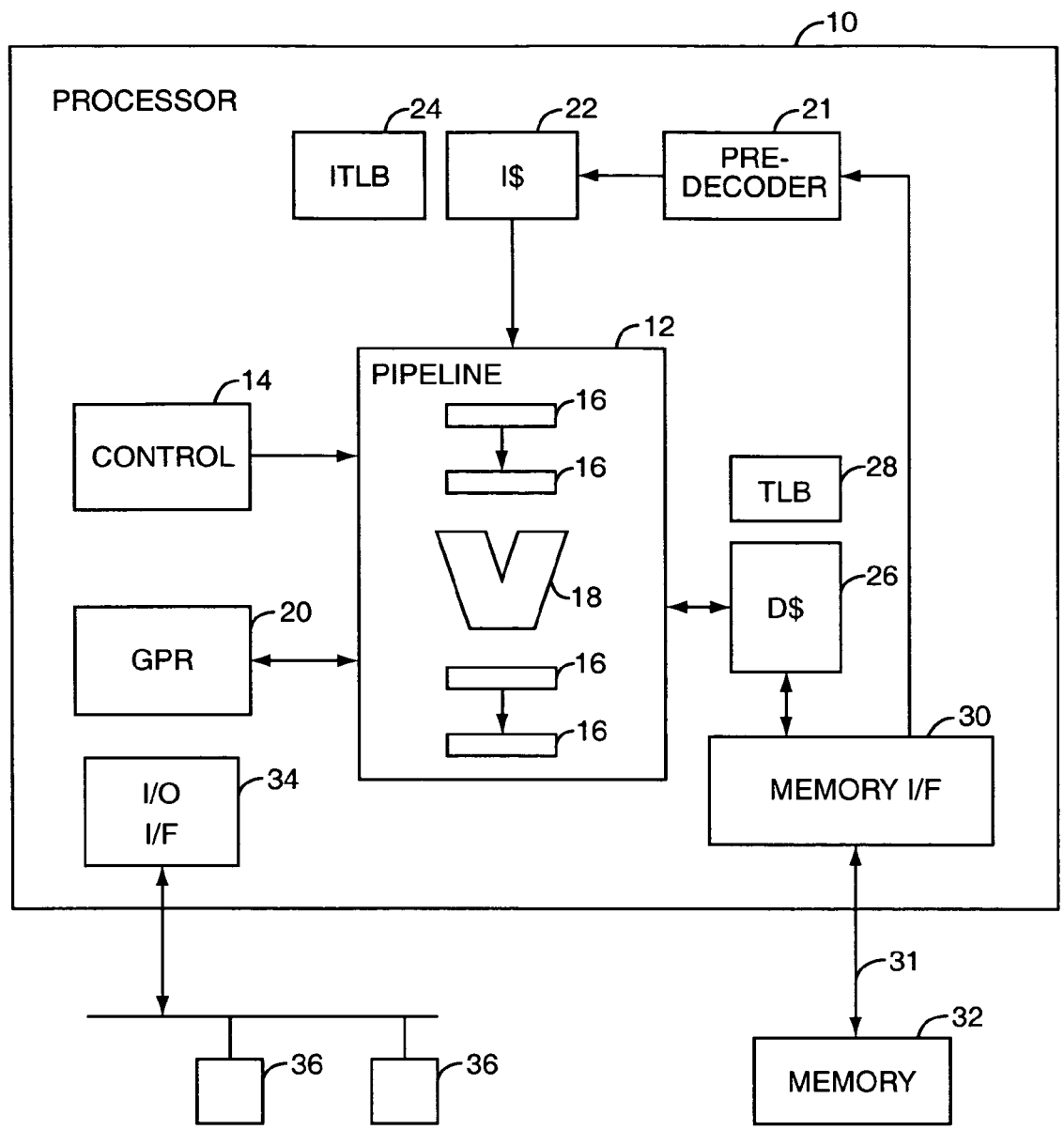
FIG. 1 is a functional block diagram of a pipelined processor.

FIG. 1 depicts a functional block diagram of a representative processor 10. The processor 10 executes instructions in an instruction execution pipeline 12 according to control logic 14. The pipeline includes various registers or latches 16, organized in pipe stages, and one or more Arithmetic Logic Units (ALU) 18. A General Purpose Register (GPR) file 20 provides registers comprising the top of the memory hierarchy. The pipeline fetches instructions from an Instruction Cache 22, with memory addressing and permissions managed by an Instruction-side Translation Lookaside Buffer (ITLB) 24, and optionally some initial decoding of instructions performed by a pre-decoder 21. Data is accessed from a Data Cache 26, with memory addressing and permissions managed by a main Translation Lookaside Buffer (TLB) 28. In various embodiments, the ITLB may comprise a copy of part of the TLB. Alternatively, the ITLB and TLB may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30. The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

Many programs are written as if the computer executing them had very large (ideally, unlimited) amounts of fast memory. Most modern processors simulate that ideal condition by employing a hierarchy of memory types, each having different speed and cost characteristics. The memory types in the hierarchy vary from very fast and very expensive at the top, to progressively slower but more economical storage types in lower levels. A typical processor memory hierarchy may comprise registers 20 in the processor (gates) at the top level; backed by one or more on-chip caches 22, 26 (SRAM); possibly an off-chip cache (SRAM) (not shown); main memory 32 (DRAM); disk storage (magnetic media) (not shown); and tape or CD (magnetic or optical media) (not shown) at the lowest level. Most portable electronic devices, have limited, if any, disk storage, and hence main memory 32 (often limited in size) is the lowest level in the memory hierarchy.

In a computer memory hierarchy, each lower level maintains a full (but possibly stale) copy of the data resident in higher layers. That is, the data stored in higher levels replicates that in the lower levels. Since smaller, higher level storage may map to multiple locations in the larger, lower level memory, a mapping scheme is required to translate addresses between hierarchy layers. Most processors operate in a very large, conceptually contiguous virtual address space. Main memory 32 is accessed 31 in a physical address space that is constrained by hardware and system parameters. Caches 22, 26—disposed between the processor core and main memory—may be accessed completely by virtual addresses, completely by physical addresses, or in combination (such as by using a virtual index and a physical tag). Regardless of the cache configuration, however, addresses must eventually be translated from virtual address space to a physical address space.

Additionally, many operating systems isolate programs from each other by giving them separate virtual address spaces in which the program is allowed to use the full address range specified by the Instruction Set Architecture. However, the actual physical memory available in the system is typically far less in size than what can be addressed by the program in its virtual address space. It is well known in the art that a virtual to physical mapping of the addresses can be used to manage the accesses to the limited physical memory in such a way that programs can run in the limited physical memory.

Memory management by the operating system, in conjunction with specialized memory management hardware such as a TLB, can prevent programs from overwriting each other's data. Memory management also can provide security by preventing one process from reading another program's data. Memory management can promote reliability by disallowing user-level programs from accessing supervisor-level data structures. If supervisor-level data structures, such as operating system allocation tables and parameters, are overwritten a system crash can result. Both the virtual and physical address spaces are divided up and managed in units known as pages. Permission attributes are commonly assigned to memory 32 on a per-page basis.

The TLB 28 performs virtual to physical memory address translations, and additionally maintains the permission information and other attributes for the physical memory page to which a virtual address is mapped. The ITLB 24 does the same for instructions. In the case of physically indexed and/or physically tagged caches, the processor virtual address must be translated for each cache access. Virtually indexed and tagged caches do not require address translation for every cache access, however, the TLB 28 is commonly consulted every time the processor 10 accesses memory 32 to check the permissions associated with the page in which the requested datum resides and to obtain the physical address mapped to the requesting virtual address. This includes checking the ITLB 24 for instruction fetches, to verify that the program has execute permission for the page.

Several techniques are known in the art for reducing ITLB 24 accesses, with associated power savings. For example in sequential accesses, all accesses will be in the same page until a page boundary is crossed. Sequential access detection depends on the page size. A memory address can be logically divided into a page number and a page offset, as depicted in Table 1 below:

TABLE 1

| Page Fields of Address | | | | | |
|---|---|---|---|---|---|
| 31 | page number | 12 | 11 | page offset | 0 |

The page number is translated by the ITLB 24. The page offset is an offset into the page that is the same for virtual and physical addresses; page offset bits are commonly not translated. The page offset comprises a number of bits necessary to address memory within the page size. For example, for a 32-bit address with 4K pages, the page number would comprise address bits [31:12] and the page offset, bits [11:0].

The Least Significant Bit (LSB) of the page number field is monitored to detect a page boundary crossing during a series of sequential accesses. In the example above, when address bit 12 toggles during sequential accesses, the processor 10 determines that a page boundary has been crossed, and the first memory access with the toggled address bit 12 should be translated through the ITLB 24 to check access permissions for the new page.

Page crossings are more difficult to ascertain for branch instructions, which may branch to fetch an instruction from a different page, but one for which the LSB of the page number field (i.e., bit 12) is the same. Hence, monitoring the LSB of the page number field is insufficient to determine if a page boundary has been crossed by a branch instruction. When the branch target address (BTA) is calculated, the bit field corresponding to a page number, i.e., BTA[31:12] can be compared to the corresponding bits of the branch instruction address (BIA), BIA[31:12]. If the two address fields are the same, then the branch target is within the same page as the branch instruction, and the ITLB 24 need not be consulted to obtain permission information for the BTA, as it will be identical to that for the BIA.

However, calculation of the BTA and its selection from among the myriad choices for the next instruction address, prior to its presentation to the ITLB 24, is typically on a critical timing path within the processor dataflow. Performing another 20-bit comparison may require an increase in machine cycle time, degrading performance more than is justified by the potential power savings from avoiding an ITLB 24 lookup if the BTA and BIA are in the same page.

According to embodiments of the present invention, access to the ITLB 24 is suppressed for a branch instruction for which the branch target address can be determined from the branch instruction address and/or the branch instruction itself, when the branch target address is in the same memory page as the address of the branch instruction itself. The processor and method disclosed and claimed herein reduce power consumption by suppressing the ITLB 24 access for a large number of branch instruction executions. In some programs, branches are encountered every four to six instructions, so this aspect alone represents significant power management improvement.

Additionally, the present invention conserves power by performing the BTA/BIA comparison only once for any branch instruction where the branch target address can be determined from the branch instruction address or the branch instruction itself, as opposed to every time the instruction is executed out of the instruction cache 22. Finally, the present invention achieves these power savings without impacting the machine cycle time, by removing the BTA/BIA comparison from the critical path of next instruction calculation and selection.

The use of a pre-decoder 21 in a pipelined processor 10 is well known. By inspecting instructions as they are accessed from main memory 32, some preliminary decoding operations may be performed, and some resulting information about the instructions may be stored in the instruction cache 22 along with the instructions. When the instructions are subsequently fetched into the pipeline 12 and decoded, the pre-decode information may allow for simplification of the decoder by offloading some of the instruction decode task.

In one embodiment of the present invention, an instruction pre-decoder 21 calculates the branch target address, or BTA, of a branch instruction for which the branch target address can be determined from the branch instruction address and/or the branch instruction itself. The pre-decoder 21 compares the BTA to the branch instruction address, or BIA, and stores a "branch target same page" bit 46 (BTSP) in the instruction cache 22 along with the branch instruction, and possibly other pre-decode information 44. When the branch instruction is subsequently fetched from the instruction cache 22 and executed (typically, many times), the BTSP bit 46 suppresses the ITLB 24 and precludes updating of the permission information the ITLB 24 previously provided.

Branch instructions where the branch target address can be determined from the branch instruction address and/or the branch instruction itself, include Program Counter (PC) relative branches and absolute address branches. PC-relative branch instructions include a Branch DiSPlacement (BDSP) field that is part of the instruction itself. The BTA of a PC-relative branch instruction is calculated by adding the BDSP to the BIA of the branch instruction. That is, $$BTA = BIA + BDSP \quad (1)$$

Absolute address branches contain a portion of the branch target address in a field that is part of the instruction itself. This field typically needs to be extended to the size of the address bus and then aligned to the address bus to create the BTA.

Figure 2:
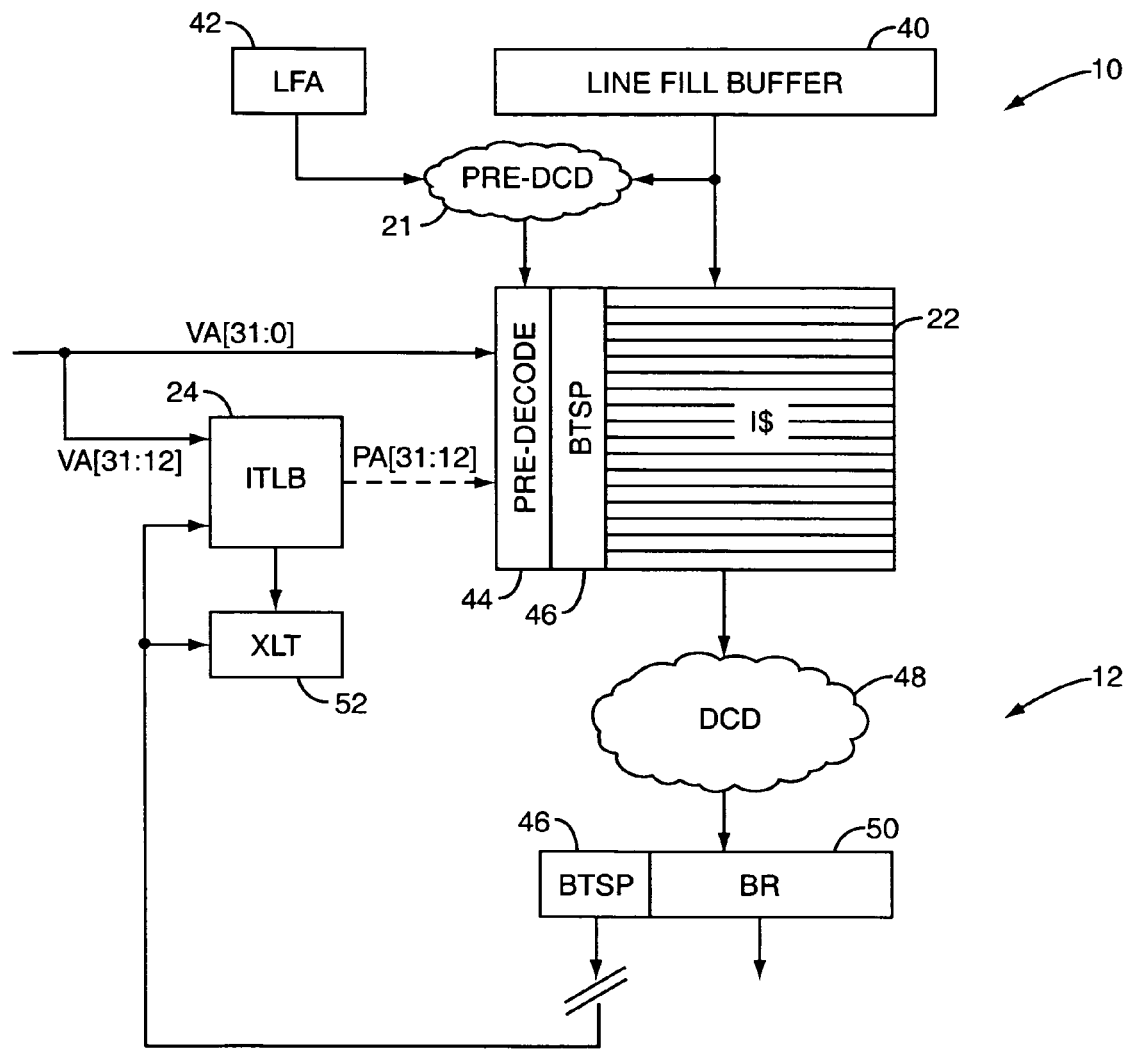
FIG. 2 is a functional block diagram of an ITLB (Instruction-side Translation Lookaside Buffer), instruction cache and part of a processor pipeline.

FIG. 2 depicts, in functional block diagram form, details of the instruction cache 22, ITLB 24 and part of the pipeline 12 of processor 10. When an instruction fetch misses in the instruction cache 22, and is retrieved from main memory 32 (see FIG. 1), a pre-decoder 21 may partially decode the instruction prior to placing it in the instruction cache 22. The pre-decoder 21 may pre-decode a group of instructions contained in a line fill buffer 40. The pre-decoder 21 may also receive the line fill address from the LFA register 42. These registers may comprise part of the memory interface 30 (see FIG. 1). The pre-decoder 21 is known in the art. The pre-decoder partially decodes instructions, and may place partially decoded information about the instructions in the instruction cache 22, indicated as pre-decode bits 44. Pre-decoded information may include, for example, the length of variable-length instructions. The pre-decoded bits 44 assist the decode logic 48 in the pipeline 12 in fully decoding the instructions.

According to one embodiment of the present invention, the branch target address (BTA) of a PC-relative or absolute address branch instruction is calculated in the pre-decoder 21, and compared to the branch instruction address (BIA) of the branch instruction. The BIA may be calculated from the line fill address (LFA) and the branch line index (BLI), or the offset of the branch instruction into the cache line (e.g., the contents of the line fill buffer), according to the following equation:

$$BIA = LFA + BLI \quad (2)$$

The pre-decoder 21 also extracts the branch displacement (BDSP) from the PC-relative branch instruction, and calculates the BTA according to equation (1), or forms the BTA from a field within the instruction itself for absolute address branches. Whether the BTA and the BIA are in the same memory page or not is then ascertained by comparing the portion of both addresses that comprises a page number. For example, in a 32-bit memory system with 4K page sizes, the page number comprises the upper twenty bits (see Table 1). The Branch Target Same Page (BTSP) bit may be determined by the following equation (or it may be assigned the opposite sense):

If $(BTA[32:12] = BIA[32:12])$ then $BTSP=1$; else
$$BTSP = 0 \quad (3)$$

One hardware description language representation of equation (3) is:

$$BTSP = \sim |(BTA[32:12] - BIA[32:12]) \quad (4)$$

That is, the page numbers are equal when their numerical difference is zero. The zero detection is depicted in equation (4) by a reduction-OR operation and an invert.

The pre-decoder 21 places the BTSP bit 46 in the instruction cache 22 along with the PC-relative or absolute address branch instruction, and associates the bit 46 with the instruction. For branch instructions that obtain or calculate a BTA from the contents of a register (i.e., non-PC-relative or absolute address branch instructions), nothing can be known about the BTA prior to an execute stage in the pipeline 12, when the BTA is actually generated. Accordingly, for non-PC-relative or absolute address branch instructions, the pre-decoder 21 may force the BTSP bit 46 to indicate a page cross, which will generate an ITLB 24 access if the branch is evaluated taken and a branch target instruction is fetched. This ensures that the access permissions are checked for such branches.

When a PC-relative or absolute address branch instruction is fetched from the instruction cache 22, its associated BTSP bit 46 is also fetched, and stored for example in a decode pipe stage latch 50. The BTSP bit 46 subsequently suppresses the ITLB 24, such as at an Enable input, when the BTA is presented to the ITLB 24 when the target address is fetched. The broken line following the BTSP bit 46 in the decode latch 50 indicates that in operation, the BTSP bit 46 flows down the pipeline with the branch instruction, and is actually presented to the ITLB 24 Enable input in an execute pipe stage. The specific architecture of the pipeline 12 is not germane to this discussion, and hence details of further stages of the pipeline 12 are omitted from FIG. 2.

In addition to suppressing the ITLB 24, the BTSP bit 46 prevents updating of the XLT latch 52, which stores the attributes output from the ITLB 24. Hence, the branch target instruction fetch will use the same attributes previously latched, which correspond to those for a previous instruction in the same memory page.

FIG. 2 depicts the virtual address VA[31:0] indexing both the ITLB 24 and the instruction cache 22. This is the case for a virtually indexed and tagged instruction cache 22. Alternatively, the instruction cache 22 may be physically indexed and tagged, in which case the ITLB 24 translates the virtual address VA[31:12] to a physical address PA[31:12], and supplies the physical address to the instruction cache 22, as indicated by a dashed line in FIG. 2. As another alternative, both address paths may exist, in the case of a virtually indexed and physically tagged cache 22.

By performing the branch target address generation for a PC-relative or absolute address branch instruction and performing a page comparison to the branch instruction address in the pre-decoder 21, and storing the results in the instruction cache 22, power is conserved several ways. First, the ITLB 24 need not be accessed for permission checks when the branch target instruction is fetched from the same page as the branch instruction itself. Second, the power to perform the calculations is expended only once. The results are stored in the BTSP bit 46 in the instruction cache 22 to be retrieved every time the instruction is executed. As hit rates in the high 90% are common for instruction caches, chances are that PC-relative and absolute address branch instructions will be executed multiple times. Storing the results of a single calculation represents a significant power savings over performing the calculation each time the instruction executes. In fact, even if multiple cycles are required to perform the address generation and comparison in the pre-decoder 21, the process still results in significant power savings due to the branch instruction being executed out of the cache many times. Finally, the BTA and BIA comparison is removed from the critical path of branch target address generation and selection, improving performance by allowing a shorter cycle time.

Those of skill in the art will recognize that the processor 10 is representative only. A broad variety of processor architectures and designs exist, and numerous variations are possible within the scope of the present invention. For example the instruction cache 22 and data cache 26 may be combined, or unified into a single cache. Alternatively, one or more additional caches may be employed, either hierarchically or in peer relationship to the caches 22, 26. Similarly, the ITLB 24 may be combined with the TLB 28 or the processor might employ a DTLB for the data side.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of reducing power consumption in a pipelined processor, the method comprising:

detecting during execution of the pipelined processor whether a target address of a branch instruction is located in a memory page that includes a branch instruction address associated with the branch instruction prior to placing the branch instruction in a cache storing instructions, wherein the detecting is carried out by a pre-decoder and produces a detection output; and suppressing access to a Translation Lookaside Buffer (TLB) upon fetching an instruction from the target address when the detection output of the pre-decoder indicates that the target address of the branch instruction is located in the memory page that includes the branch instruction address associated with the branch instruction.

2. The method of claim 1, further comprising:

determining a branch target same page bit value associated with the branch instruction, wherein the branch target same page bit value is based upon the detection output; and storing the branch target same page bit value in the cache.

3. The method of claim 1, wherein suppressing the TLB access upon fetching the instruction from the target address comprises disabling the TLB.

4. The method of claim 3, further comprising disallowing an update to a register holding a previous output of the TLB.

5. The method of claim 1, wherein detecting whether the target address of the branch instruction is located in the memory page that includes the branch instruction address associated with the branch instruction comprises:

calculating the target address of the branch instruction;

comparing a first page number portion, the first page number portion associated with the target address of the branch instruction, to a second page number portion, the second page number portion associated with the branch instruction address; and detecting a same page status when the first page number portion and the second page number portion have a same page number value.

6. The method of claim 5, wherein detecting the same page status comprises:

subtracting the second page number portion from the first page number portion producing a first result;

performing a reduction OR operation on the first result, producing a second result; and inverting the second result.

7. The method of claim 5, wherein calculating the target address of the branch instruction comprises adding a branch displacement to the branch instruction address.

8. The method of claim 5 wherein calculating the target address of the branch instruction comprises extracting a portion of the target address from the branch instruction.

9. The method of claim 8, wherein calculating the target address of the branch instruction further comprises extending the target address, and aligning the target address to an address bus.

10. The method of claim 5, wherein calculating the branch instruction address comprises adding a branch line index to a line fill address.

11. The method of claim 1, wherein the branch instruction comprises a Program Counter (PC)-relative branch instruction or an absolute address branch instruction.

12. The processor of claim 1, wherein suppressing comprises removing a comparison of the branch target address and the branch instruction address from a critical path of a next instruction calculation.

13. A method of reducing power consumption in a processor, the method comprising:
   detecting during execution of the processor that a target address of a branch instruction is located in a memory page includes a branch instruction address of the branch instruction, wherein the detecting is carried out by a pre-decoder;
   storing an indicator that is associated with the detecting;
   suppressing, in response to the stored indicator, an access to a Translation Lookaside Buffer (TLB) when fetching an instruction from the target address during a first execution of the branch instruction; and
   suppressing, in response to the stored indicator, a second access to the TLB when fetching another instruction from the target address during a second execution of the branch instruction.

14. The method of claim 13, wherein storing the indicator comprises storing a branch target same page bit in a cache, and associating the stored branch target same page bit with the branch instruction.

15. The method of claim 14, further comprising:
   storing the branch instruction in the cache; and
   reading the branch instruction and the branch target same page bit from the cache prior to the second execution of the branch instruction.

16. The method of claim 13, wherein suppressing access to the TLB comprises disabling the TLB.

17. A processor comprising:
   an instruction cache operative to store instructions and pre-decode information;
   page residence detection logic included in a pre-decoder, the page residence logic operative to generate an indication that a target address of a branch instruction is located in a memory page that includes a branch instruction address associated with the branch instruction prior to storing the branch instruction in the instruction cache as the pre-decode information; and
   a Translation Lookaside Buffer (TLB) operative to generate memory access permission information upon instruction fetches, wherein access to the TLB is suppressed in response to detecting the indication in conjunction with fetching a particular instruction at the target address while executing the branch instruction.

18. A processor comprising:
   a memory interface operative to access memory external to the processor, wherein the memory is organized to include pages;
   a cache memory in data transfer relationship with the memory interface, the cache memory operative to store instructions;
   a pre-decoder interposed between the memory interface and the cache memory, the pre-decoder operative to calculate a target address of a branch instruction prior to storing the branch instruction in the cache memory, and further adapted to store pre-decode information in the cache memory, the pre-decode information indicative of whether the calculated target address is located in a logical page that includes the branch instruction; and
   a Translation Lookaside Buffer (TLB) operative to manage permission attributes associated with the pages, and wherein upon fetching a first instruction at the target address of the branch instruction during execution of the branch instruction, a particular permission attribute-checking access to the TLB is selectively suppressed in response to the pre-decode information.

19. The processor of claim 18, further comprising an instruction execution pipeline operative to read the branch instruction and the pre-decode information from the cache memory.

20. The processor of claim 17, wherein access to the TLB is suppressed by disabling the TLB.

21. The method of claim 17, wherein access to the TLB is suppressed by removing a comparison of the branch target address and the branch instruction address from a critical path of a next instruction calculation.

22. The processor of claim 17, wherein the branch instruction comprises a Program Counter (PC)-relative branch instruction or an absolute address branch instruction.

* * * * *